April 17, 1962　　　C. S. CZYRYK ET AL　　　3,030,527
PIEZO-ELECTRIC POWER SOURCE ASSEMBLY
Filed Aug. 8, 1955　　　　　　　　　　　　2 Sheets-Sheet 1

INVENTORS:
CHESTER S. CZYRYK &
DONALD E. HERMANSON
BY Benjamin P. Napper
ATTY

April 17, 1962 C. S. CZYRYK ET AL 3,030,527
PIEZO-ELECTRIC POWER SOURCE ASSEMBLY
Filed Aug. 8, 1955 2 Sheets-Sheet 2

INVENTORS:
CHESTER S. CZYRYK &
DONALD E. HERMANSON
BY *Benjamin F. Wapper*
ATTY

_United States Patent Office_

3,030,527
Patented Apr. 17, 1962

3,030,527
PIEZO-ELECTRIC POWER SOURCE ASSEMBLY
Chester S. Czyryk, Chicago, and Donald E. Hermanson, Palatine, Ill., assignors to Stewart-Warner Corporation, Chicago, Ill., a corporation of Virginia
Filed Aug. 8, 1955, Ser. No. 526,884
1 Claim. (Cl. 310—8.7)

Our invention relates to electrical generators operable upon application of a suddenly applied force to generate very high voltage electrical energy and, if desired, to store the energy temporarily for subsequent use. Such generators find particular application in ordnance fuzing apparatus.

It is known that piezo-electric crystals, especially those made of barium titanate, are very effective mechanico-electric transducers to convert the energy of vibrational and impact forces applied to the crystal, into electrical energy. However, in general, no simple generator of this type was capable of storing the electrical energy generated because upon application of a force tending to deform the crystal the voltage (and current) was of one polarity while upon release of the deforming force the voltage (and current) generated was of opposite polarity and the electrical energy generated upon application of the force, and that generated upon release of the force was approximately the same, and thus substantially cancelled one another. The crystal was thus not capable of producing any substantial amount of electrical energy capable of being stored by any simple means, so to make it possible to use the energy some interval after the impact force was applied to the crystal.

We have discovered that by confining a piezo-electric crystal (particularly a crystal of barium titanate) in a certain manner, this difficulty is overcome. When thus confined, the electrical energy pulse produced upon application of the impact force differs in value from that of the pulse produced upon release of the force. Thus, even though the pulses are of opposite polarity, they do not completely cancel one another when supplied to a capacitor or similar electrical energy storage means. In fact, the two electrical energy pulses of opposite polarity may be made of sufficiently different energy values that a useful amount of electric energy, at a relatively high voltage, is stored in the crystal.

For example, if the crystal is of disc shape and has its generally parallel faces plated with, or in contact with, conductors, the crystal functions as a capacitor to store the differential of electrical energy produced upon application of an impact force (in a direction generally perpendicular to the conducting surfaces) and the energy produced upon release of the impact force. However, this differential in energy produced upon application and release of the force of impact occurs only if the crystal is confined to different degrees with respect to expansion in radial directions in different planes generally parallel to its conductive surfaces. While the reasons for this differential in electrical energy production upon application and release of forces tending to deform the crystal are not entirely clear, we shall in the following description, with reference to the accompanying drawings, set forth how the invention has been embodied in several forms which have been found to produce the desired results.

It is thus an object of the invention to provide an improved mounting means whereby useful electrical energy may be produced and stored upon application and release of mechanical forces tending to deform the crystal.

Other objects will appear from the following description, reference being had to the accompanying drawings, in which.

Figure 1:
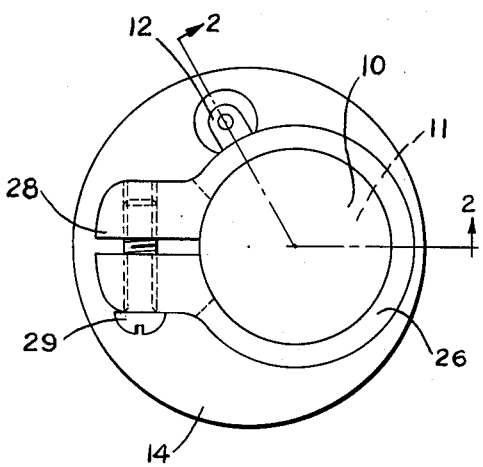
FIG. 1 is a plan view of the crystal and its mounting prior to being "potted" in sealing and insulating compound.

As shown in the drawings, the generator comprises a pair of piezo-electric crystals 10 and 11, preferably, due to the efficiency of response, temperature stability, and economy, made of barium titanate. These crystals are preferably of disc-like cylindrical shape and have their flat surfaces coated with a conductor, as for example silver. The crystals need not necessarily be of disc-like shape, but this shape lends itself to convenience and economy in manufacture.

Figure 2:
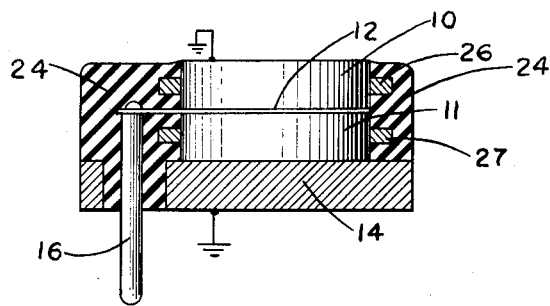
FIG. 2 is a transverse sectional view taken on the section line 2—2 of FIG. 1.
Figure 3:
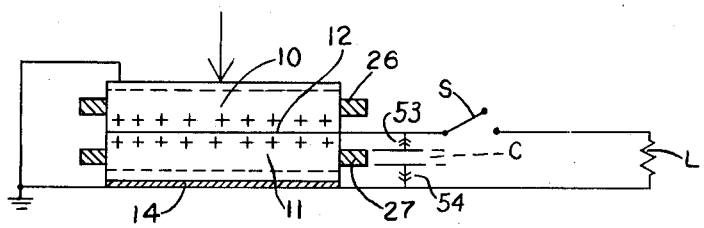
FIG. 3 is a diagrammatic view of the crystal shown as part of a schematic wiring diagram in connection with which it may be used.

In FIG. 2 two such crystals are shown with a metal foil conductor 12 between them. The crystals are mounted on a conducting base 14 which together with the outer conducting surface on the crystal 10 may be considered as connected to the ground, as indicated. During the manufacture and treatment of piezo-electric crystals, the crystal structure is subjected to a polarizing electrical charge in a selected direction. This charge causes polarization of the crystal in the selected direction to permit maximum current flow in said direction. This direction is commonly referred to as the axis of polarization. This well known polarization is indicated in FIG. 3. The crystals are electrically connected in parallel and oriented so that the energy generated thereby upon the deformation thereof is additive. The plug connector 16 is secured mechanically and electrically to the foil 12, and the conducting surface on the outer surface of crystal 10 is suitably connected to the base 14, indicated in FIG. 2 by showing this surface and the base as being connected to ground. It will be understood that a single crystal, or any number of crystals, properly connected, may be used.

The crystals and the connector 16 are potted in a suitable insulating compound 24 which retains the crystal in place and provides a protective casing for the crystals. The crystals are confined against radial expansion by rings 26 and 27 which are preferably formed integrally with clamping lugs 28 and 29, the latter being clamped together by a screw 30.

FIG. 3 illustrates the manner in which the crystal generator may be utilized. It is connected in series with a high impedance low energy load upon closure of a switch S. The inherent capacity of the crystals may be used for storing energy obtained at the time the impact force is applied and released. When the normally open switch S is closed, the stored energy is utilized. As shown in FIG. 3, a supplementary capacitor C may be connected to the conducting surfaces 12 and 14 in parallel with the crystals 10 and 11 by means of the mating plug assemblies 53 and 54.

It has been found that the crystals, due to their confinement by the rings 26 and 27, produce more energy upon removal of the deforming force than upon its application. Thus, the capacitor C will retain a substantial charge after the deforming force has been removed.

Figure 4:
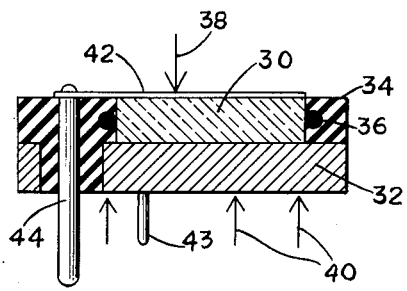
FIG. 4 is a transverse diametral sectional view of a modified form of the invention.

FIG. 4 illustrates a modified form of the invention in which a crystal 30 of disc-like shape is mounted on a conducting base 32, is secured in position and protected by a potting compound 34 of annular shape. Prior to pouring the potting compound, a torroidal ring 36 of a soft rubber-like compound is placed around the periphery of the crystal about medially with respect to the plane surfaces of the crystal.

When a force, such as indicated by the arrow 38, and resisted by forces holding the base stationary, indicated by the arrows 40, is applied to the crystal 30 and released, a high voltage will be generated and retained as a charge between the base 32 and the conducting surface film or foil 42 on the opposite plane surface of the crystal and hence between soldering lugs 43 and 44, respectively connected to the base 32 and conducting film 42.

Figure 5:
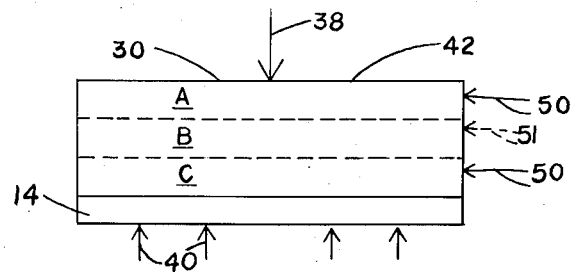
FIG. 5 is a diagram illustrating the manner in which forces are applied to the crystal.

The underlying principle of the invention may be described conveniently by reference to the diagram, FIG. 5. In this figure, reference characters employed in FIG. 4 are applied to corresponding parts.

For the purpose of discussion, the crystal is illustrated as comprising three parallel layers or zones A, B and C. When a force 38 (resisted by forces 40 holding the base stationary) is applied to the crystal 30, there is a tendency for the crystal to expand radially, or at least to be deflected so that some zone or zones tend to expand radially. However, some of the zones are radially confined more closely or more tightly than other zones. This is illustrated in FIG. 5, by showing representative full line force indicating arrows directed radially inward against the periphery of zones A and C, and similarly, a force indicating dotted arrow 51 directed against the periphery of zone B.

To accomplish the purposes of the invention, it appears to be necessary that the degree of confinement of the crystal, represented by the arrows 50 and 51, be different. For example, in the form of the invention shown in FIG. 1, the central zones (corresponding to zone B of FIG. 5) are confined by the relatively unyielding rings 26 and 27, whereas the adjacent zones of these crystals (corresponding to zones A and C of FIG. 5) are confined by the yieldable potting compound 24.

While we have shown and described particular embodiments of our invention, it will be apparent that variations and modifications thereof may be made without departing from the principles and scope of the invention. We therefore desire, by the following claim, to include all such variations and modifications by which substantially the results of our invention may be obtained through the use of substantially the same or equivalent means.

We claim:

In combination a pair of piezo-electric crystals secured in face to face relation, means providing a conducting surface between the crystals, the axes of polarization of the crystals being generally perpendicular to the conducting surface and the direction of polarization of the crystals being opposite to each other, electrically connected means providing conductors on the outer surfaces of the crystals insulated from the conducting surface, and mechanical structure encircling the peripheries of the crystals intermediate their outer surfaces and defining at least a pair of annular surfaces, each annular surface engaging substantially the entire peripheral surface of a respective crystal in at least one plane generally parallel to the conducting surface to provide a degree of radial restriction of each crystal in its respective one plane differing from the degree of restriction of the crystal in planes adjacent its one plane, whereby, upon application and release of a mechanical force in a direction generally perpendicular to the conducting surface, a charge will be generated and retained on the crystals.

References Cited in the file of this patent

UNITED STATES PATENTS

| | | |
|---|---|---|
| 1,619,125 | Hough | Mar. 1, 1927 |
| 2,138,036 | Kunze | Nov. 29, 1938 |
| 2,448,352 | Corlin | Aug. 31, 1948 |
| 2,471,625 | Johnstone | May 31, 1949 |
| 2,507,770 | Claasen | May 16, 1950 |
| 2,540,194 | Ellett | Feb. 6, 1951 |
| 2,705,760 | Minnich | Apr. 5, 1955 |
| 2,717,372 | Anderson | Sept. 6, 1955 |
| 2,717,373 | Anderson | Sept. 6, 1955 |
| 2,773,250 | Aigrain et al. | Dec. 4, 1956 |

FOREIGN PATENTS

| | | |
|---|---|---|
| 619,872 | Great Britain | Mar. 16, 1949 |